(12) United States Patent
Aoyama et al.

(10) Patent No.: US 6,888,786 B2
(45) Date of Patent: May 3, 2005

(54) OPTICAL DEVICE AND OPTICAL STORAGE DEVICE

(75) Inventors: Nobuhide Aoyama, Kawasaki (JP); Shin-ya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 10/623,979

(22) Filed: Jul. 21, 2003

(65) Prior Publication Data

US 2004/0017761 A1 Jan. 29, 2004

Related U.S. Application Data

(63) Continuation of application No. PCT/JP01/00690, filed on Feb. 1, 2001.

(51) Int. Cl.$^7$ ................................................. G11B 7/00
(52) U.S. Cl. ............................. 369/110.02; 369/112.16; 369/44.23
(58) Field of Search ............................. 369/13.29, 13.3, 369/13.31, 110.01, 110.02, 44.23, 112.16, 112.17, 112.18, 112.19

(56) References Cited

U.S. PATENT DOCUMENTS

| | | | | |
|---|---|---|---|---|
| 5,060,212 A | * | 10/1991 | Fujita et al. | 369/44.12 |
| 5,119,352 A | * | 6/1992 | Bell, Jr. | 369/13.29 |
| 5,124,868 A | * | 6/1992 | Matsubayashi et al. | 369/110.04 |
| 5,535,055 A | * | 7/1996 | Ono et al. | 359/495 |
| 5,777,971 A | * | 7/1998 | Choi | 369/44.23 |
| 5,978,346 A | * | 11/1999 | Mizuno et al. | 369/112.17 |
| 6,377,525 B1 | * | 4/2002 | Iida | 369/53.1 |
| 6,700,842 B1 | * | 3/2004 | Nishi | 369/124.12 |

FOREIGN PATENT DOCUMENTS

| | | | |
|---|---|---|---|
| JP | 02-276045 | | 11/1990 |
| JP | 10-124951 | | 5/1998 |
| JP | 11-086322 | | 3/1999 |
| JP | 11162033 A | * | 6/1999 |
| JP | 2000-306262 | | 11/2000 |

* cited by examiner

Primary Examiner—Thang V. Tran
(74) Attorney, Agent, or Firm—Greer, Burns & Crain, Ltd.

(57) ABSTRACT

An optical device including a light source for emitting diverging light, a polarizing beam splitter for transmitting or reflecting the diverging light according to a polarized light component, a collimator lens for converting the diverging light transmitted through the polarizing beam splitter into collimated light, and an objective lens for focusing the collimated light on an object. The optical device further includes an optical element arranged between the collimator lens and the objective lens for producing a phase difference of $+90°\pm15°$ or $-90°\pm15°$ between P-polarized light and S-polarized light. The optical element has a principal axis perpendicular or parallel to a plane of incidence of the diverging light on the polarizing beam splitter. For example, the optical element is provided by a quarter-wave plate having an optic axis perpendicular or parallel to the plane of incidence of the diverging light on the polarizing beam splitter.

14 Claims, 14 Drawing Sheets

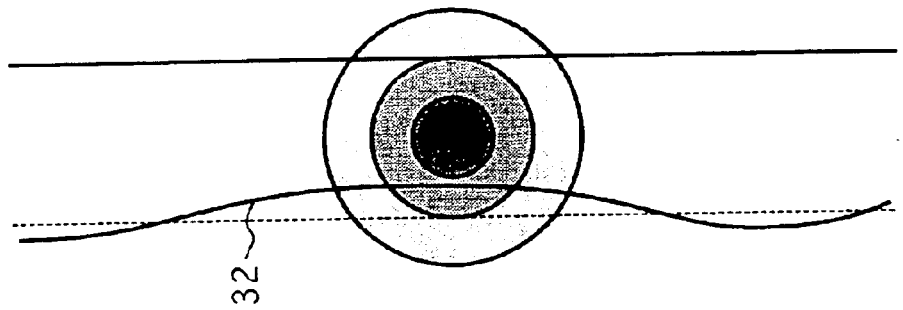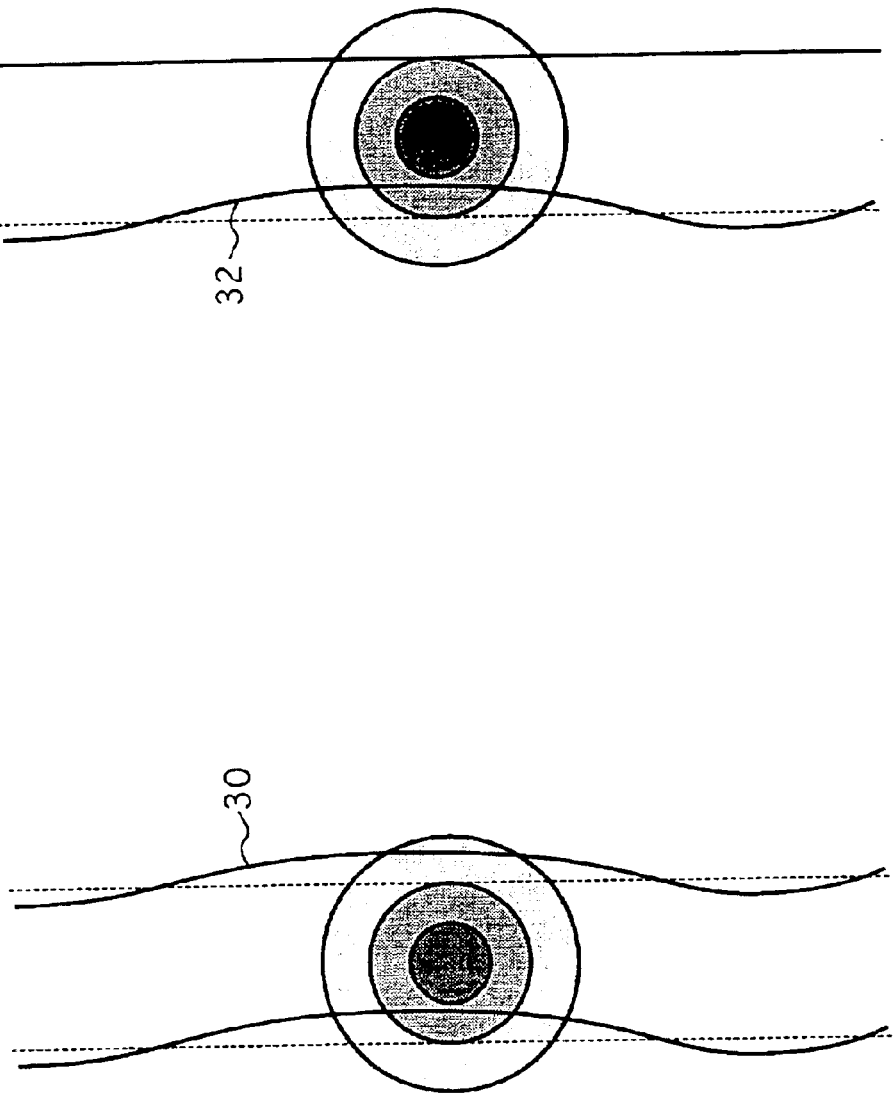

F I G. 1 3
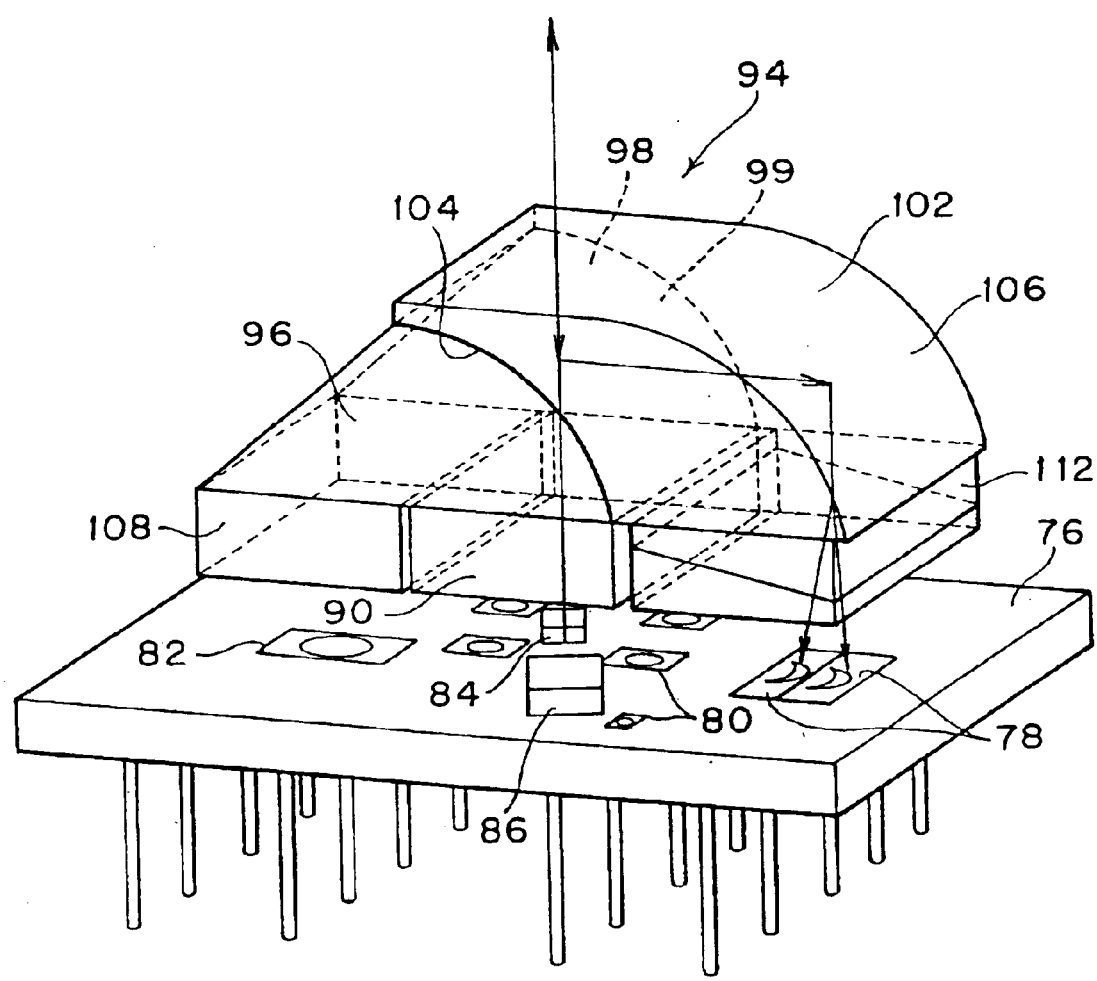

OPTICAL DEVICE AND OPTICAL STORAGE DEVICE

This is a continuation of International Application NO. PCT/JP01/00690, filed Feb. 1, 2001, which was not published in English.

BACKGROUND OF THE INVENTION

1. Field of the Invention

The present invention relates generally to an optical device, and more particularly to an optical storage device using the optical device.

2. Description of the Related Art

An optical disk is used as a medium for recording/reproducing voice, character, image information, etc. in the form of compact disk (CD), CD-ROM, CD-R, digital versatile disk (DVD), magneto-optical disk (MO disk), mini-disk (MD), etc. Such an optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data from/to the optical disk by means of an optical pickup.

The optical pickup in a recent optical disk drive intended to realize size reduction is composed of a fixed optical assembly including a laser diode, a polarizing beam splitter for reflecting and transmitting a laser beam, and a photodetector for receiving reflected light from an optical disk, and a movable optical assembly including a carriage and an actuator mounted on the carriage and having an objective lens. The carriage is movable in the radial direction of the optical disk along a pair of rails by means of a voice coil motor (VCM).

A write-power laser beam emitted from the laser diode of the fixed optical assembly is first collimated by a collimator lens, next transmitted by the polarizing beam splitter, next reflected by a beam raising mirror of the actuator, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarizing beam splitter, and finally detected by the photodetector, thereby converting the detected optical signal into an electrical signal.

To further reduce the size of the optical pickup, there has been developed such a configuration that diverging light emitted from a laser diode is directly incident on a polarizing beam splitter. In this optical pickup, converging light reflected from an optical disk is returned to the polarizing beam splitter, and is partially reflected by the polarizing beam splitter. Accordingly, a lens for focusing the light reflected by the polarizing beam splitter onto a photodetector can be omitted. To make the optical pickup more compact, there has extensively been developed an integrated optical pickup (optical head) configured by integrating a laser diode, polarizing beam splitter, optical output monitor, servo detection system, RF signal detection system, and preamplifier circuit.

In these optical pickups, the angle of incidence of the diverging light on a polarization separating film of the polarizing beam splitter has a distribution, so that the transmittance and reflectance of the polarization separating film, the phase difference between polarized light components, and the polarization direction have respective distributions. To prevent a degradation in characteristics due to these distributions, the aperture diameter of the diverging light emitted from a light source is reduced to suppress the influence of the distribution of the incidence angle to the polarizing beam splitter. Accordingly, in a conventional read-only mini-disk drive or the like wherein no problem arises even when a utilization efficiency of light is low, an optical pickup having a configuration that the diverging light is incident on the polarizing beam splitter is adopted to realize the size reduction.

In a rewritable optical disk drive, high-speed recording and high-speed transfer are required and it is therefore necessary to increase a utilizable quantity of light from a light source. In reducing the size of such an optical disk drive, the distribution of optical characteristics due to the distribution of the incidence angle to the polarization separating film of the polarizing beam splitter may suppress the performance of the disk drive. Referring to FIG. 1, there is shown a distributed condition of a traveling direction of diverging light 4 emitted from a laser diode 2. The laser diode 2 emits P-polarized diverging light with respect to a polarization separating film 8 of a polarizing beam splitter (PBS) 6. In this description, P-polarized light is defined as linearly polarized light such that the vibrational direction of an electric vector is in the incidence plane of the diverging light 4 to the polarization separating surface 8, and S-polarized light is defined as linearly polarized light such that the vibrational direction of an electric vector is perpendicular to the incidence plane of the diverging light 4 to the polarization separating film 8.

As shown in FIG. 1, the P-polarized diverging light 4 emitted from the laser diode 2 spreads both in an X direction and in a Y direction. A light ray (principal ray) 4a on the optical axis of the diverging light 4 is incident on the polarization separating surface (BS surface) 8 at an incidence angle of 45°. As shown in FIG. 3, the PBS 6 is arranged so that the polarization direction of the diverging light 4 (P-polarized light) emitted from the laser diode 2 is parallel to an ideal incidence plane 10 to the BS surface 8 of the PBS 6. The ideal incidence plane 10 is a plane defined below. That is, the ideal incidence plane 10 means a plane containing both the light ray 4a and reflected light obtained by reflection of the light ray 4a on the BS surface 8 of the PBS 6. Therefore, the ideal incidence plane 10 is perpendicular to the BS surface 8.

Since the diverging light 4 emitted from the laser diode 2 spreads both in the X direction and in the Y direction as mentioned above, a peripheral light ray 4b of the diverging light 4 intersecting the X direction is not parallel to the ideal incidence plane 10, but forms a certain angle θ. Accordingly, the incidence plane of the light ray 4b to the BS surface 8 forms the angle θ with respect to the ideal incidence plane 10. The polarization direction of the diverging light 4 emitted from the laser diode 2 is fixed in such a manner that the polarization direction of the light ray 4a on the optical axis of the diverging light 4 is the same as the polarization direction of the peripheral light ray 4b of the diverging light 4. Accordingly, the polarization direction of the light ray 4b and its incidence plane form the angle θ. As defined above, the P-polarized light is linearly polarized light whose vibrational direction of an electric vector is in the incidence plane, and the polarization direction of the light ray 4b is not parallel to the incidence plane. Therefore, the light ray 4b includes a slight amount of S-polarized light component to the BS surface 8 in addition to the P-polarized light.

As shown in FIG. 4, the transmission axis (P-polarization direction) of the BS surface 8 and the polarization direction of the incident light 4b form the angle θ, so that the polarization direction of the light ray 4b transmitted through the BS surface 8 undergoes rotation by the angle θ. In a cross section 12 of the diverging light 4 shown in FIG. 2, the polarization direction 14 in a central region 12a is a P-polarization direction, and the polarization direction 14' in a side region 12b spreading in the X direction is rotated according to the spreading of the diverging light. Thus, the polarization direction is distributed in the cross section 12 of the diverging light 4 as shown in FIG. 2. That is, the rotational angle of the polarization direction has an angular distribution in a direction perpendicular to the ideal incidence plane 10. This distribution of the polarization direction similarly arises also in a beam spot focused on a medium. In FIG. 4, reference numeral 15 denotes a traveling direction of light.

Referring to FIG. 5, there is shown a polarization direction in an optical path of a laser beam transmitted through a polarizing beam splitter (PBS) and returned thereto after reflection on a medium 20. That is, the laser beam transmitted through the polarizing beam splitter is converted into collimated light 16 by a collimator lens, and next focused on the medium 20 by an objective lens 18. The laser beam focused on the medium 20 is reflected on the medium 20, and reflected light from the medium 20 is returned through the objective lens 18 and the collimator lens to the polarizing beam splitter. The polarization direction in the forward path after transmission through the PBS to reflection on the medium 20 is the same as the direction of an incidence plane to the PBS. The polarization direction in the backward path after reflection on the medium 20 to incidence on the PBS is geometrically the same as the polarization direction in the forward path. However, the peripheral light rays of the collimated light 16 in the backward path are converged by the collimator lens to enter the PBS, so that the polarization direction of the peripheral light rays of the converging light from the collimator lens forms an angle with respect to the direction of an incidence plane to the PBS in the backward path. As a result, the polarization plane of the collimated light 16 in the backward path is rotated in appearance. In the case that light quantity distribution in the backward path is symmetrical, this rotation of the polarization plane causes no problem. In actual, however, light quantity distribution in the backward path is nonsymmetrical, causing a degradation in optical characteristics.

As shown in FIG. 6, a guide groove 22 for tracking is formed on a rewritable optical disk. Laser light directed on a track 24 formed on the disk is diffracted by the guide groove 22 adjacent to the track 24 to generate diffracted light 26 as shown in FIG. 6. This diffracted light 26 interferes with reflected light 28 from the track 24 to form a bowl-shaped bright/dark pattern. Accordingly, when a beam spot on the disk moves across the guide groove 22, the bowl-shaped bright/dark pattern is varied to cause apparent rotation of a polarization plane. As a result, there arises a problem that a tracking error signal may leak into a reproduction signal based on the rotation of a polarization plane in reproducing information recorded on a magneto-optical recording medium.

FIG. 7 shows the leakage of a tracking error signal (TES) into an MO2T signal as a shortest mark of a magneto-optical signal (MO signal). In the case that a beam spot follows a track as in detection of magneto-optical information, no problem arises. However, if there is dust on the medium or defect of the track, noise due to such dust or defect may leak into the MO signal, so that the MO signal cannot be detected. Further, an optical disk formed with a wobble track 30 as shown in FIG. 8A or a one-sided wobble track 32 as shown in FIG. 8B for the purpose of address detection is known as a rewritable optical disk. The wobble track is a wavy track whose center is transversely deviated by a minute distance from the center of a normal track at a predetermined frequency, e.g., 22 kHz, and an address on the disk can be determined according to the phase of the wavy track. Accordingly, it is unnecessary to record addresses on the disk, and more information can therefore be recorded. However, since the wobble track 30 or the one-sided wobble track 32 has a high frequency band, tracking servo does not follow the meandering by the wobbling, so that the detection of the MO signal is difficult because of the leakage of noise into the MO signal.

A method of suppressing a disturbance due to the leakage of noise into the MO signal is disclosed in Japanese Patent Laid-open No. Hei 7-57320. In this method, a laser diode, PBS, and optical disk are arranged so that the track direction on the optical disk and the direction of an incidence plane of diverging light from the laser diode to the PBS are perpendicular to each other. However, the direction of divergence angle distribution of the light from the laser diode, the polarization direction of the light, and the spectral characteristics of the PBS are fixed. Another method of suppressing a leak signal into the MO signal by masking a part of a return optical path in an MO detection system is proposed in Japanese Patent Application No. Hei 12-40849. In this method, it is difficult to adjust a mask position.

SUMMARY OF THE INVENTION

It is therefore an object of the present invention to provide an optical device which can suppress the degradation in CNR due to the rotation of a polarization plane in making diverging light or converting light incident on a polarizing beam splitter.

It is another object of the present invention to provide an optical storage device which can suppress the degradation in CNR due to the rotation of a polarization plane in making diverging light or converting light incident on a polarizing beam splitter.

In accordance with an aspect of the present invention, there is provided an optical device including a light source for emitting diverging light; a polarizing beam splitter for transmitting or reflecting the diverging light according to a polarized light component; a collimator lens for converting the diverging light transmitted through the polarizing beam splitter into collimated light; an objective lens for focusing the collimated light on an object; and a first optical element arranged between the collimator lens and the objective lens for producing a phase difference of +90°±15° or −90°±15° between P-polarized light and S-polarized light, the first optical element having a principal axis perpendicular or parallel to a plane of incidence of the diverging light on the polarizing beam splitter.

Preferably, the first optical element includes a quarter-wave plate having an optic axis perpendicular or parallel to the plane of incidence of the diverging light on the polarizing beam splitter. Alternatively, the first optical element includes a reflecting mirror whose plane of incidence of the collimated light is parallel or perpendicular to the plane of incidence of the diverging light on the polarizing beam splitter, and a phase difference producing film formed on the reflecting mirror.

More preferably, the optical device further includes a second optical element for separating reflected light from the object into polarized light components having polarization directions orthogonal to each other, and a third optical element arranged between the second optical element and the polarizing beam splitter for producing a phase difference of −90°±15° or +90°±15°. Preferably, the second element includes a Wollaston prism, and the third optical element includes a phase difference producing film formed on a polarization separating surface of the polarizing beam splitter or a phase difference producing film formed on a total reflection surface of a glass block bonded to the polarizing beam splitter.

In accordance with another aspect of the present invention, there is provided an optical storage device capable of at least reading information recorded on an optical storage medium, including a light source for emitting diverging light; a polarizing beam splitter for transmitting or reflecting the diverging light according to a polarized light component; a collimator lens for converting the diverging light transmitted through the polarizing beam splitter into collimated light; an objective lens for focusing the collimated light on the optical storage medium; a reproduction signal detector for detecting a reproduction signal from reflected light from the optical storage medium; a servo signal detector for detecting a servo signal for light focused on the optical storage medium from the reflected light; and a first optical element arranged between the collimator lens and the objective lens for producing a phase difference of +90°±15° or −90°±15° between P-polarized light and S-polarized light, the first optical element having a principal axis perpendicular or parallel to a plane of incidence of the diverging light on the polarizing beam splitter.

Preferably, the first optical element includes a quarter-wave plate having an optic axis perpendicular or parallel to the plane of incidence of the diverging light on the polarizing beam splitter. Alternatively, the first optical element includes a reflecting mirror whose plane of incidence of the collimated light is parallel or perpendicular to the plane of incidence of the diverging light on the polarizing beam splitter, and a phase difference producing film formed on the reflecting mirror. Preferably, the polarization separating surface of the polarizing beam splitter has a cylindrical shape, and the total reflection surface of the glass block bonded to the polarizing beam splitter has a cylindrical shape such that the reflected light is focused on the reproduction signal detector.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8A is a diagram showing a wobble track;

FIG. 8B is a diagram showing a one-sided wobble track;

FIG. 13 is a perspective view showing a photodetector substrate and a beam splitter unit in the optical pickup shown in FIG. 12;

DESCRIPTION OF THE PREFERRED EMBODIMENTS

Figure 1:
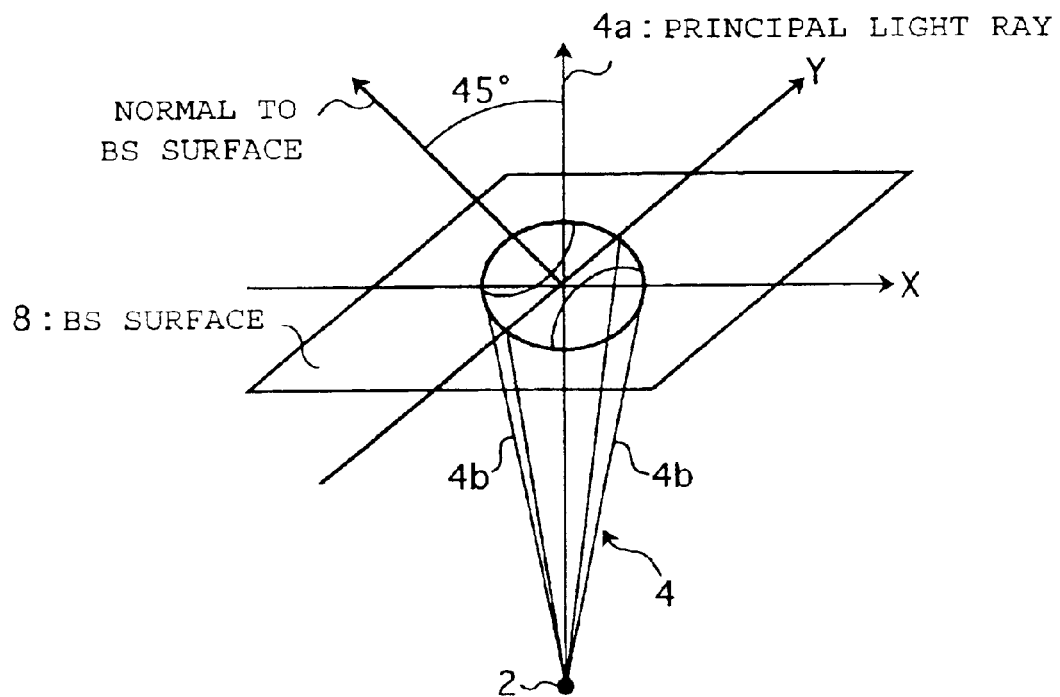
FIG. 1 is a diagram showing a traveling direction of diverging light with respect to a polarization separating surface.
Figure 2:
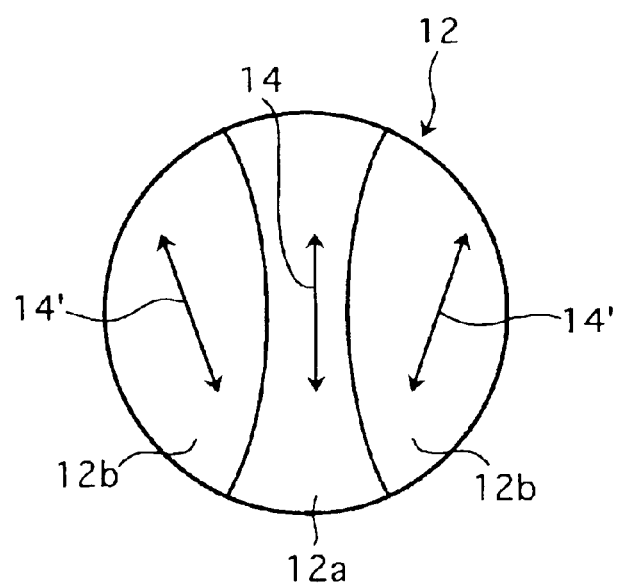
FIG. 2 is a diagram showing polarization directions in a cross section of the diverging light passed through a polarizing beam splitter.
Figure 3:
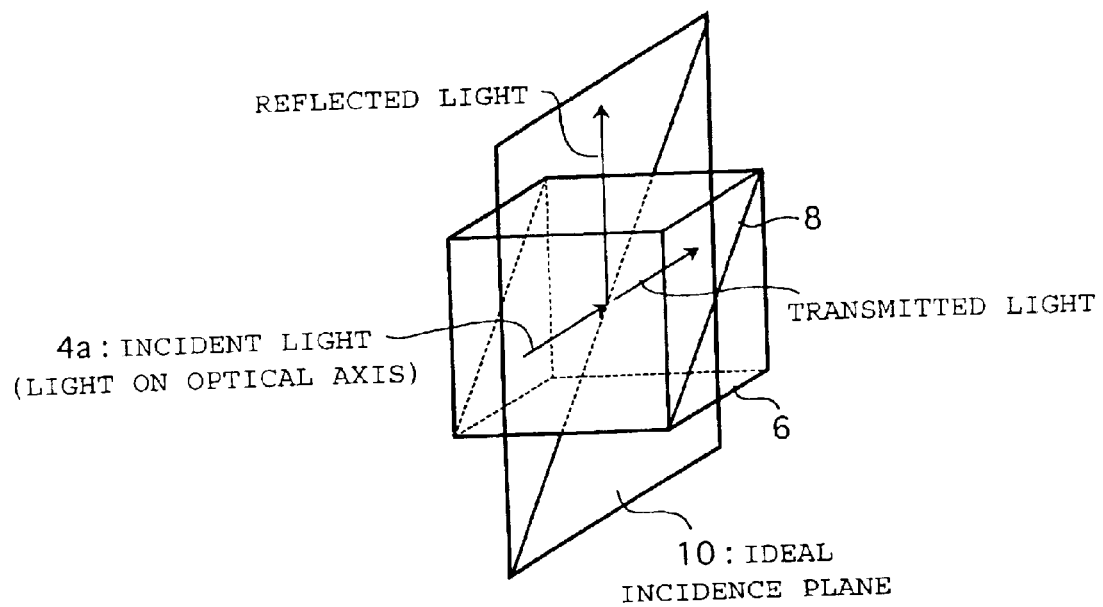
FIG. 3 is a diagram for illustrating an ideal incidence plane to the polarization separating surface.
Figure 4:
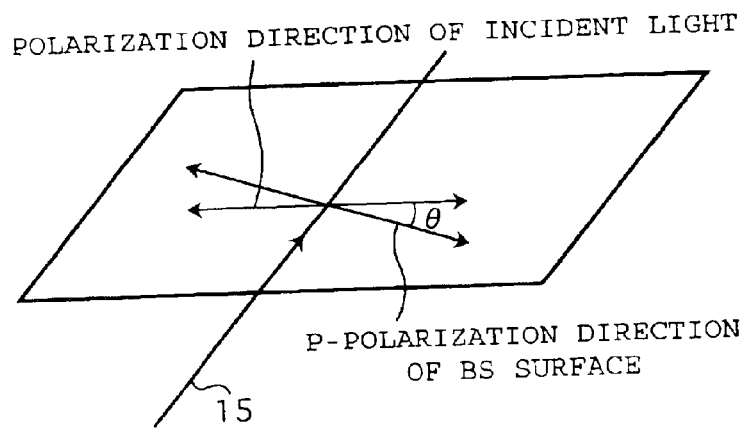
FIG. 4 is a diagram showing the relation between the direction of a transmission axis in the polarization separating surface and the direction of polarization of incident light.

The principle of the optical storage device according to the present invention will now be described with reference to FIG. 9. P-polarized diverging light 35 emitted from a laser diode 34 is transmitted through a polarizing beam splitter (PBS) 36, and next converted into collimated light 42 by a collimator lens 40. The peripheral light ray of the diverging light 35 in the horizontal direction has a given angle with respect to the ideal incidence plane to a polarization separating film 38, so that the collimated light 42 emerged from the collimator lens 40 has a distribution of polarization directions as shown in a circle 50. A quarter-wave plate 48 is arranged so that its optic axis is parallel or perpendicular to the ideal incidence plane of the diverging light 35 to the PBS 36. By passing the collimated light 42 through the quarter-wave plate 48, a portion of the collimated light 42 whose polarization plane has been rotated is converted into elliptically polarized light, so that the collimated light 42 emerged from the quarter-wave plate 48 has a distribution of polarization directions as shown in a circle 52. The collimated light 42 emerged from the quarter-wave plate 48 is next focused on an optical disk 46 by an objective lens 44. The quarter-wave plate 48 may be provided by a wave plate capable of producing a phase difference of +90°±15° or −90°±15° between P-polarized light and S-polarized light. Preferably, a wave plate capable of producing a phase difference of +90°±5° or −90°±5° between P-polarized light and S-polarized light is used.

Figure 5:
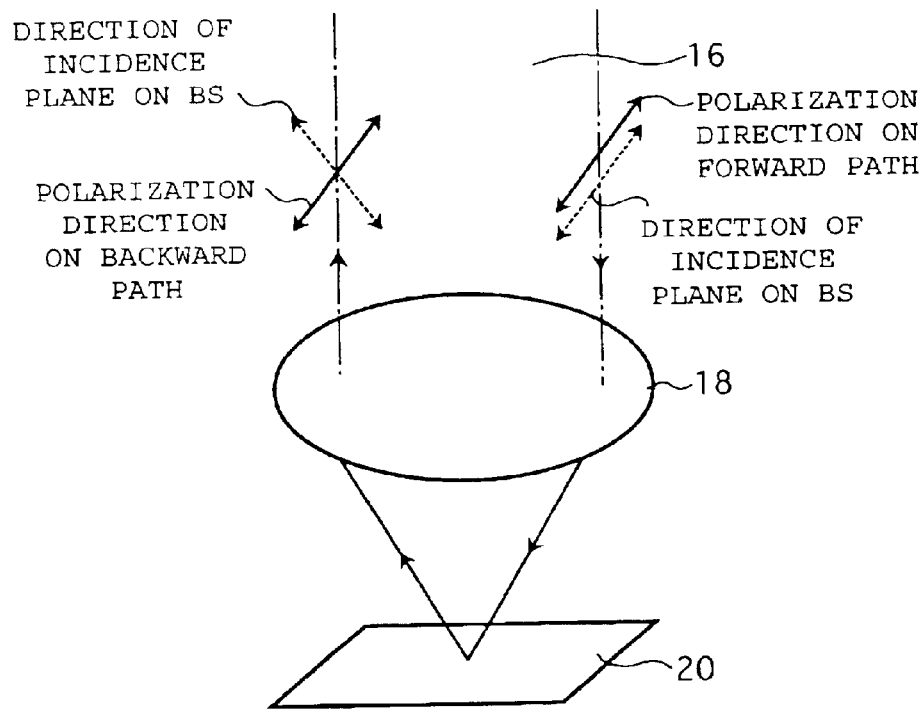
FIG. 5 is a diagram showing the relation between the plane of polarization of laser light and the plane of incidence on the polarizing beam splitter.
Figure 6:
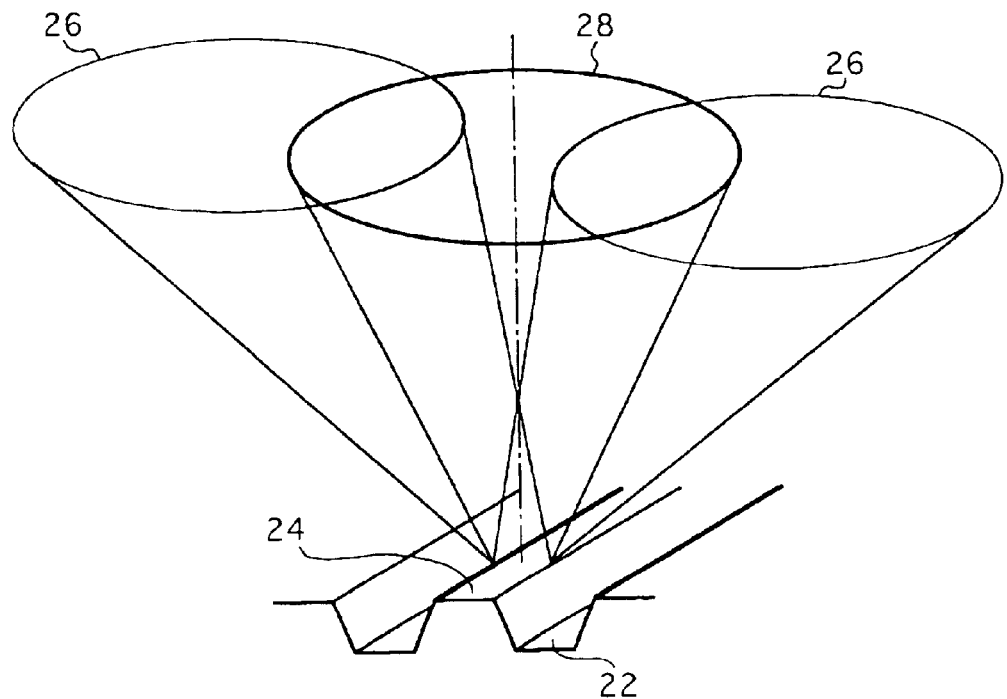
FIG. 6 is a diagram showing a diffraction pattern from a guide groove formed on a disk.
Figure 7:
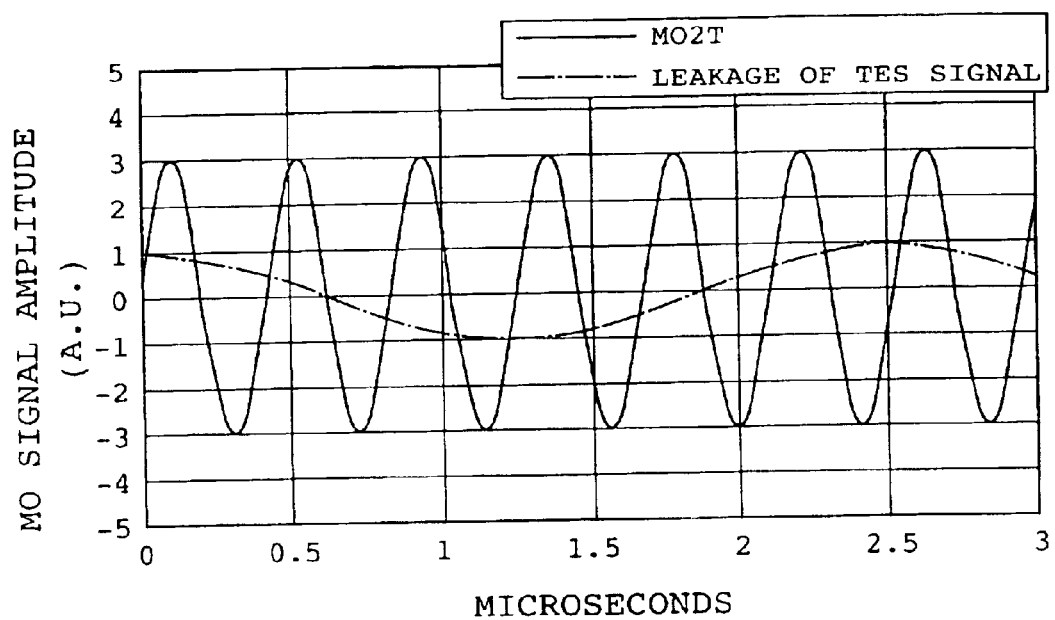
FIG. 7 is a graph showing the leakage of a tracking error signal into an MO signal.

Reflected light from the optical disk 46 on the basis of the collimated light 42 is converted into collimated light by the objective lens 44. As shown in a circle 54, the rotational direction of the polarization plane of the reflected light on the backward path is reversed from that of the polarization plane of the collimated light 42 on the forward path at the same beam position. Accordingly, if the quarter-wave plate 48 is not used, the angle formed between the polarization plane on the backward path and the incidence plane to the PBS 36 becomes large as shown in FIG. 5. According to the present invention, the quarter-wave plate 48 having an optic axis perpendicular or parallel to the incidence plane to the PBS 36 is arranged to thereby reduce the above angle. As a result, the distribution of polarization directions after passing through the quarter-wave plate 48 on the backward path becomes similar to that before passing through the quarter-wave plate 48 on the forward path as shown in a circle 56. The quarter-wave plate 48 may be formed of a uniaxial or biaxial birefringent material.

The collimated light on the backward path is next converted into converging light by the collimator lens 40 to enter the PBS 36. In the PBS 36, about 30% of the P-polarized light component of the converging light is reflected on the polarization separating film 38 and about 97% of the S-polarized light component of the converging light is reflected on the polarization separating film 38. Then, the reflected light from the PBS 36 is passed through a quarter-wave plate 58, a Wollaston prism 60, and a multilens 62, and is focused on a photodetector 64 for detecting an MO signal. The quarter-wave plate 58 functions to compensate for the phase difference produced by the quarter-wave plate 48. According to the present invention, the sum of the phase difference produced by the quarter-wave plate 48 and the phase difference produced by the quarter-wave plate 58 falls within the range of 0°±15°, preferably 0°±5°. The converging light passed through the quarter-wave plate 58 is separated into ordinary rays and extraordinary rays by the Wollaston prism 60. The ordinary rays and the extraordinary rays emerged from the Wollaston prism 60 enter two divided regions of the photodetector 64, respectively. Detection signals from these two divided regions of the photodetector 64 are differentially detected by any method well known in the art, thereby detecting a magneto-optical signal (MO signal). Thus, by designing the device so that the sum of the phase difference produced by the quarter-wave plate 48 and the phase difference produced by the quarter-wave plate 58 becomes almost 0°, the leakage of noise due to the guide groove on the optical disk, any medium defects, etc. into the MO signal can be reduced in the condition where the MO signal itself is highly maintained.

Figure 9:
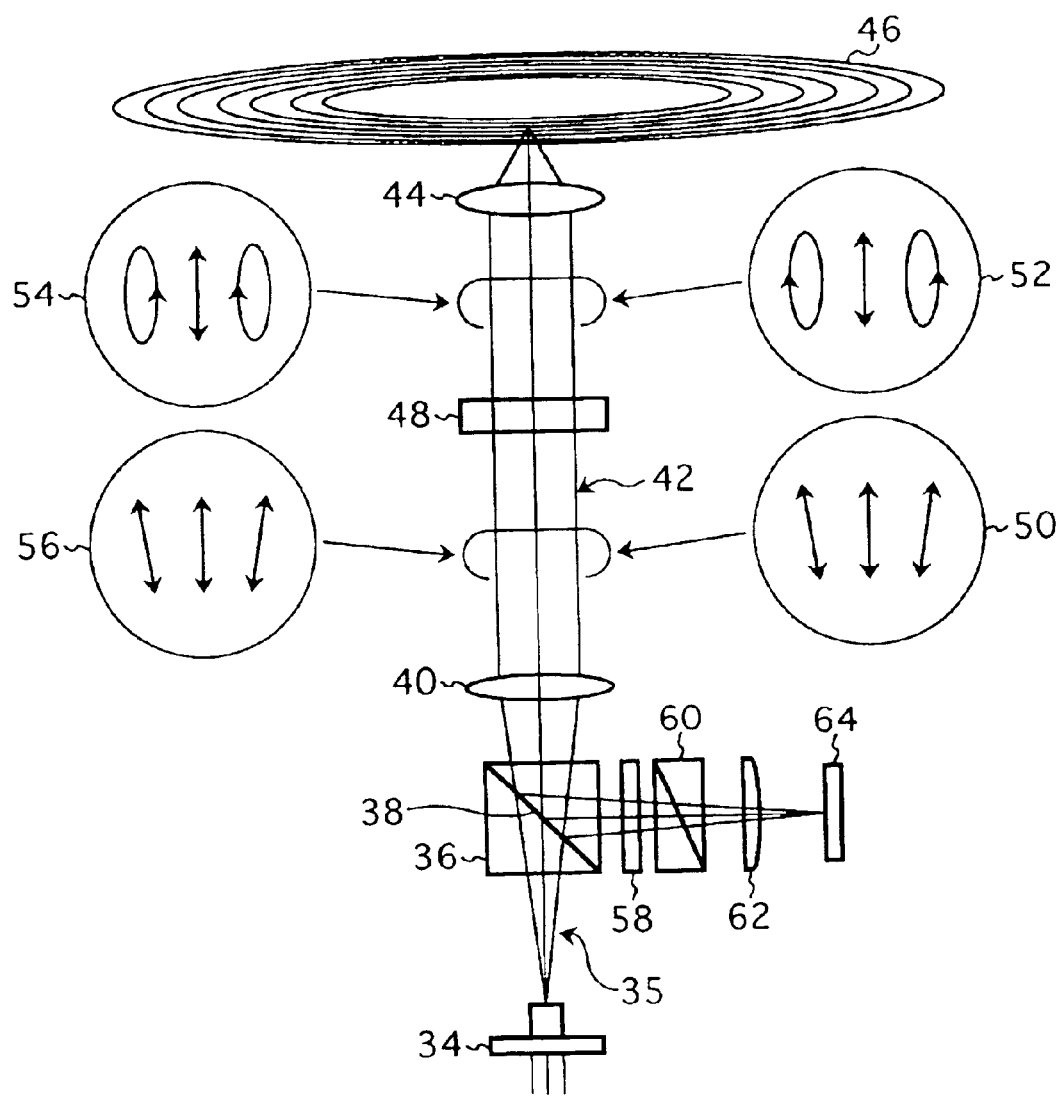
FIG. 9 is a diagram for illustrating the principle of the present invention using a quarter-wave plate.
Figure 10:
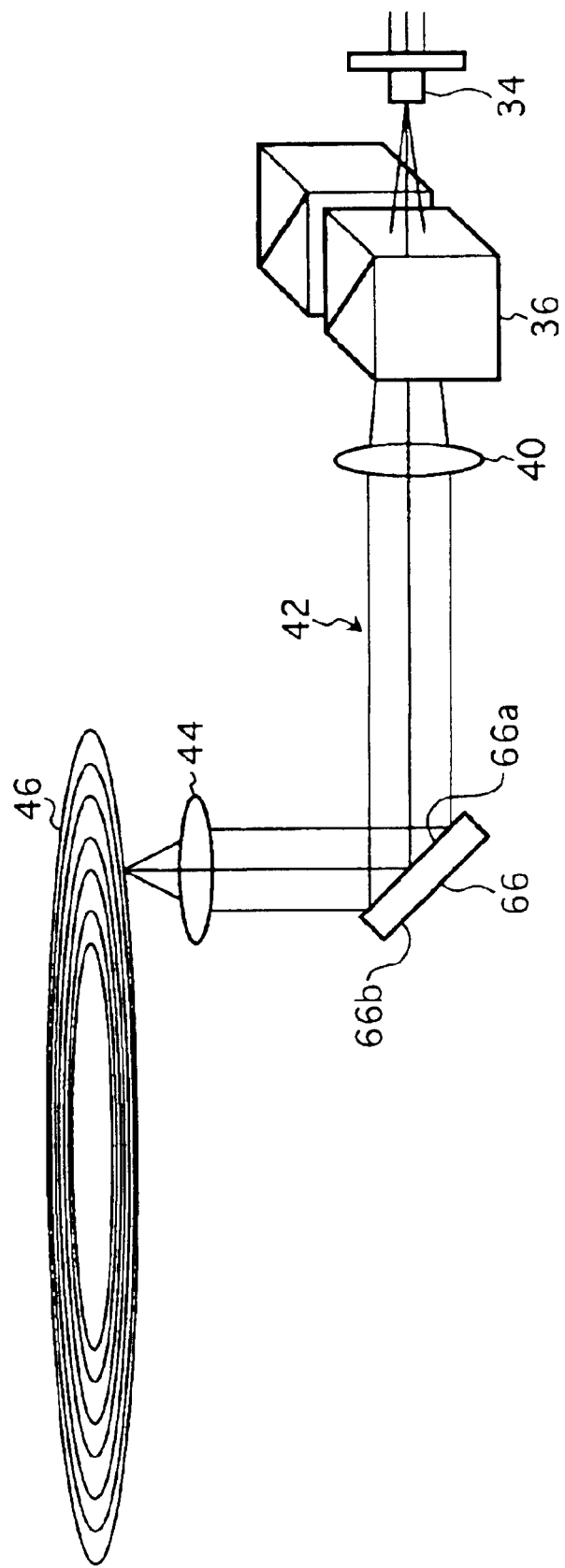
FIG. 10 is a diagram for illustrating the principle of the present invention using a beam raising mirror having a phase difference producing film.

Referring to FIG. 10, there is shown a modification of the configuration shown in FIG. 9. In this modification, a beam raising mirror 66 having a phase difference producing film on its upper surface 66a or lower surface 66b is used in place of the quarter-wave plate 48 shown in FIG. 9, so as to reflect the collimated light 42, thereby obtaining an effect similar to that obtained by the configuration shown in FIG. 9. In the configuration shown in FIG. 10, the upper surface 66a of the beam raising mirror 66 is coated with a phase difference producing film for producing a reflective phase difference of +90° or −90°. This phase difference producing film is formed from a dielectric multilayer film, for example. While the phase difference producing film is formed on the upper surface 66a of the beam raising mirror 66 in the configuration shown in FIG. 10, the phase difference producing film may be formed on the lower surface 66b of the beam raising mirror 66. In this case, an antireflection film must be formed on the upper surface 66a of the beam raising mirror 66. Thus, the beam raising mirror 66 has a function of phase difference control, so that the leakage of noise due to the guide groove on the optical disk, any medium defects, etc. into the MO signal can be reduced without increasing the number of parts.

Figure 11:
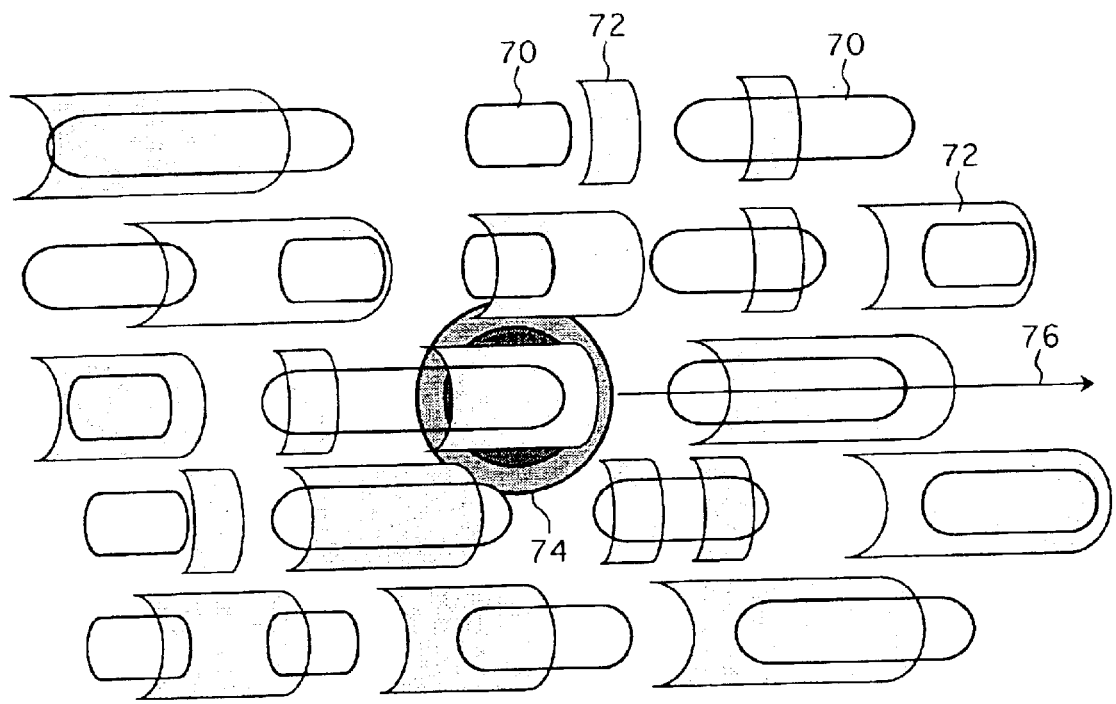
FIG. 11 is a diagram showing marks on a concurrent ROM/RAM medium.

The optical disk drive according to the present invention is greatly effective also for a concurrent ROM/RAM medium configured by forming a magneto-optical film on a ROM disk having pits 70 for recording information as shown in FIG. 11. In FIG. 11, reference numerals 72 denote magneto-optical marks (MO marks), and a beam spot 74 moves in a direction of arrow 76. In the concurrent ROM/RAM medium, it is required to simultaneously read a ROM signal (a change in light quantity by each pit 70) and a RAM signal (a change in polarized light component by each MO mark 72). According to the present invention, such a change in polarized light component and a change in light quantity can be distinguished from each other, so that the leakage of a ROM signal into a RAM signal can be suppressed.

Figure 12:
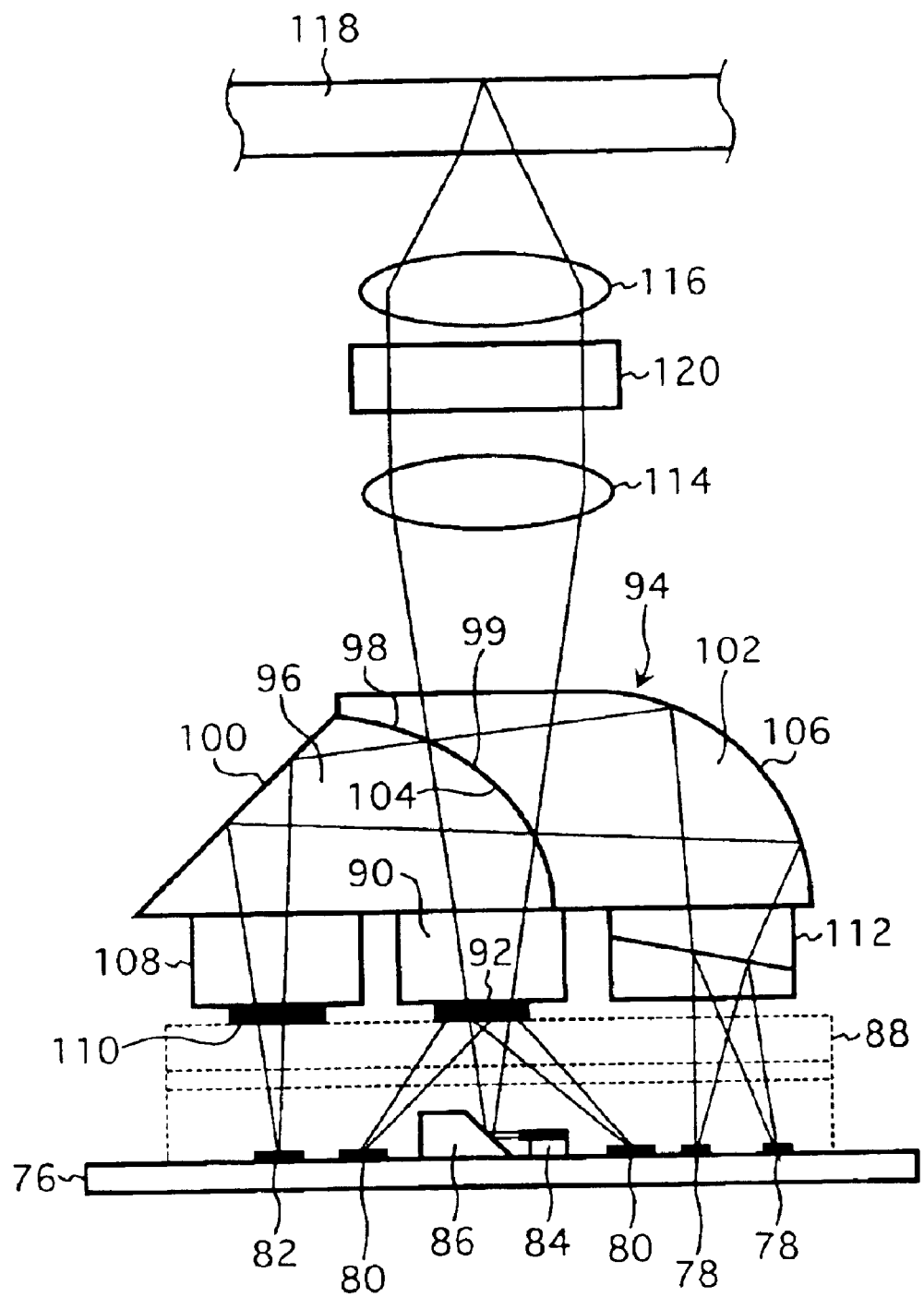
FIG. 12 is a diagram showing the configuration of an optical pickup according to a preferred embodiment of the present invention.

Referring to FIG. 12, there is shown an optical pickup for an optical disk drive according to a preferred embodiment of the present invention. FIG. 13 is a schematic perspective view of a beam splitter unit shown in FIG. 12. As shown in FIGS. 12 and 13, photodetectors 78 for detecting an MO signal, photodetectors 80 for detecting a servo signal, and a photodetector 82 for monitoring the output power of a semiconductor laser are formed integrally on an Si substrate 76. Further, a laser diode 84 and a reflecting prism 86 are mounted on the substrate 76. The reflecting prism 86 is formed from BK glass (manufactured by Shott Inc.), for example, and has a reflecting surface coated with a phaseless reflecting film. The reflecting prism 86 is fabricated by glass molding, polishing, etc. Reference numeral 88 denotes a cap formed of Kovar for hermetically sealing the photodetectors 78, 80, and 82, the laser diode 84, and the reflecting prism 86 on the substrate 76.

A hologram 92 formed on a glass substrate 90 is bonded on the cap 88. Many holograms can be produced at a time by forming a plurality of hologram patterns on a single glass substrate by etching and next cutting the glass substrate by dicing to obtain the individual hologram patterns. The hologram 92 has a patterned diffraction grating for separating a focusing error signal and a tracking error signal.

A beam splitter unit 94 is fixedly mounted on the glass substrate 90 opposite to the hologram 92 by an optical adhesive. The beam splitter unit 94 includes a glass block 96 having a cylindrical surface 98 and an inclined surface 100, and a glass block 102 bonded to the glass block 96. A polarization separating film 99 is formed on the cylindrical surface 98 of the glass block 96. The glass block 102 has a concave cylindrical surface 104 just fitted with the cylindrical surface 98, and a cylindrical reflecting surface 106. The concave cylindrical surface 104 of the glass block 102 is bonded to the cylindrical surface 98 of the glass block 96 by an optical adhesive. The cylindrical reflecting surface 106 of the glass block 102 is coated with a phase difference producing film formed from a dielectric multilayer film. Preferably, the inclined surface 100 of the glass block 96 and the cylindrical reflecting surface 106 of the glass block 102 are coated with reflecting films. A glass plate 108 formed with a focusing hologram lens 110 is bonded to the lower surface of the glass block 96. Further, a Wollaston prism 112 for separating the reflected light into ordinary rays and extraordinary rays is bonded to the lower surface of the glass block 102.

Reference numeral 114 denotes a collimator lens for converting P-polarized diverging light emitted from the laser diode 84 into collimated light. Reference numeral 120 denotes a quarter-wave plate having an optic axis perpendicular or parallel to the incidence plane of the diverging light to the polarization separating film 99. The collimated light emerged from the quarter-wave plate 120 has a distribution of polarization directions as shown in the circle 52 in FIG. 9. This collimated light is focused on a recording surface of a magneto-optical disk 118 by an objective lens 116.

In operation, the P-polarized diverging light emitted from the laser diode 84 is reflected by the reflecting prism 86 to convert the optical path from a horizontal path into a vertical path. Then, the diverging light is transmitted through the hologram 92, and about 70% of the transmitted light through the hologram 92 is transmitted through the polarization separating film 99. The laser light reflected on the polarization separating film 99 is further reflected on the inclined surface 100, and is next focused on the power monitoring photodetector 82 by the focusing hologram lens 110. Then, the power of the laser diode 84 is controlled to a given level according to an output signal from the photodetector 82. On the other hand, the diverging light transmitted through the polarization separating film 99 is converted into collimated light by the collimator lens 114, and this collimated light is passed through the quarter-wave plate 120, so that a part of this collimated light is converted into elliptically polarized light. Then, the transmitted light through the quarter-wave plate 120 is focused on the recording surface of the magneto-optical disk 118 by the objective lens 116.

Reflected light from the recording surface of the magneto-optical disk 118 undergoes magnetic Kerr rotation by write information, thereby including an S-polarized light component. This reflected light is reconverted into collimated light by the objective lens 116, and this collimated light is passed through the quarter-wave plate 120 to have a distribution of polarization directions as shown in the circle 56 in FIG. 9. The reflected light emerged from the quarter-wave plate 120 is converged by the collimator lens 114 to enter the beam splitter unit 94. About 70% of the P-polarized light component of the reflected light is transmitted through the polarization separating film 99, and about 30% of the P-polarized light of the reflected light is reflected on the polarization separating film 99. On the other hand, about 97% of the S-polarized light component of the reflected light is reflected on the polarization separating film 99. While the proportion of the S-polarized light component in the reflected light incident on the polarization separating film 99 is very small, the proportion of the S-polarized light component in the reflected light from the polarization separating film 99 is increased by reflecting most of the S-polarized light component of the incident reflected light.

The reflected light from the polarization separating film 99 is totally reflected downward on the cylindrical reflecting surface 106 of the glass block 102 to enter the Wollaston prism 112. Since a phase difference producing film is formed on the cylindrical reflecting surface 106, the phase difference produced in the quarter-wave plate 120 is canceled by this phase difference producing film. The reflected light from the cylindrical reflecting surface 106 is separated into ordinary rays and extraordinary rays by the Wollaston prism 112, and is next detected by the photodetectors 78. That is, the photodetectors 78 include a photodetector for detecting the ordinary rays and a photodetector for detecting the extraordinary rays. Detection signals from these two photodetectors 78 are differentially detected by any method well known in the art to thereby detect a magneto-optical signal.

Figure 15:
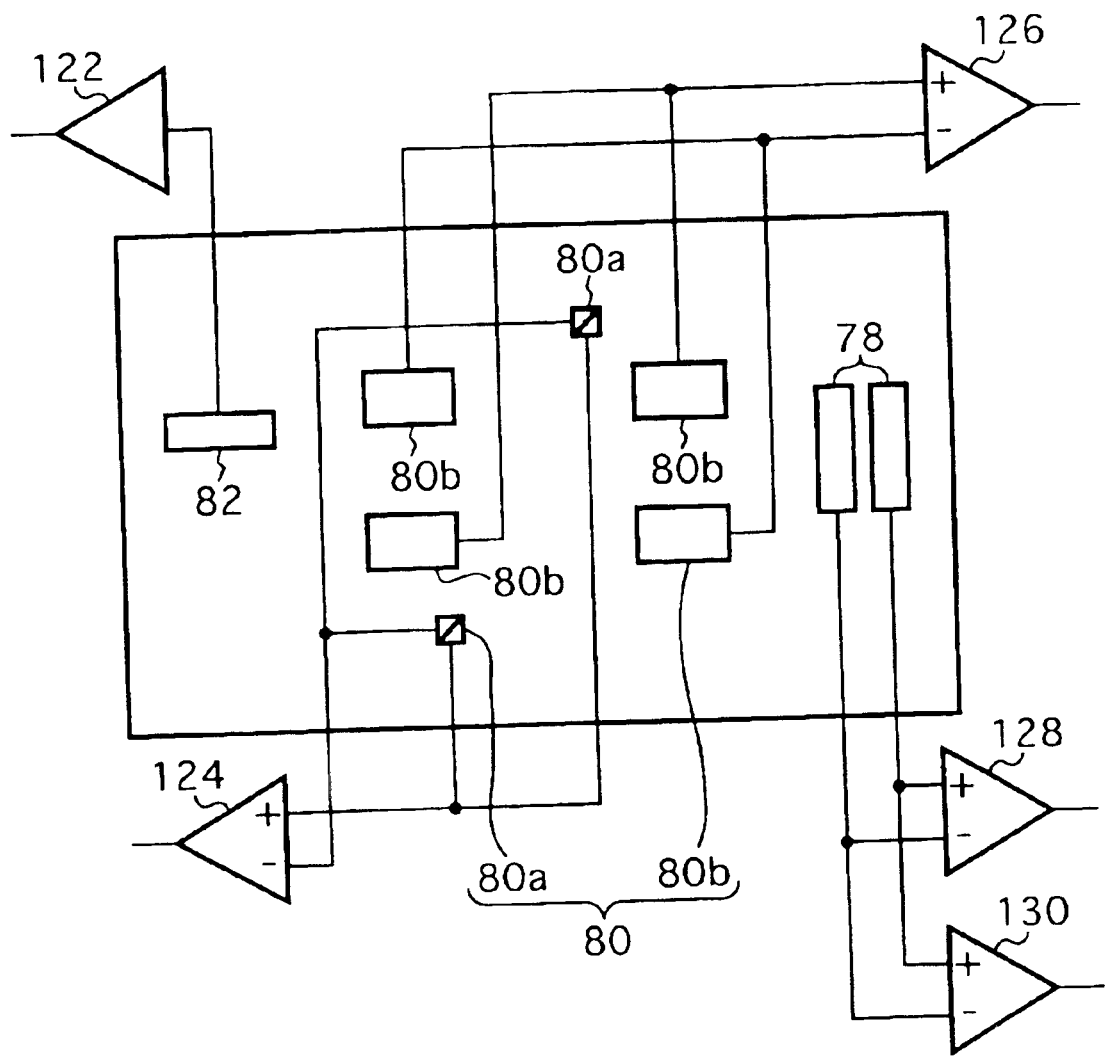
FIG. 15 is a block diagram showing connections of integrated photodetectors and preamplifiers used in this preferred embodiment.

On the other hand, the reflected light transmitted through the polarization separating film 99 enters the hologram 92. The hologram 92 diffracts the incident reflected light to emerge diffracted beams, which enter the servo detection photodetectors 80. As shown in FIG. 15, the servo detection photodetectors 80 include focusing error detection photodetectors 80a and tracking error detection photodetectors 80b.

A hologram may be formed by direct drawing with an electron beam or a laser beam, for example. In performing the direct drawing, it is necessary to slope the section of an interference pattern of a hologram, thereby increasing the efficiency. This requirement can be met by multiple drawing. Another forming method for a hologram includes the steps of preliminarily forming a large hologram pattern by direct drawing, reducing the large hologram pattern by means of a stepper to prepare a mask, and transferring the reduced hologram pattern by photolithography. In this case, an interference pattern is formed by ion-beam etching with a photoresist or the like as a mask. As another method, a hologram may be formed by holographic exposure with an auxiliary exposure system.

Figure 14A:
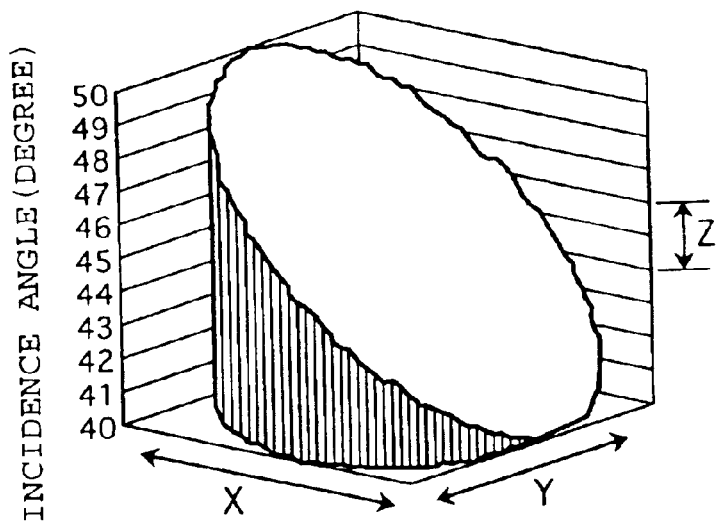
FIG. 14A is a graph showing the distribution of incidence angles on a flat polarization separating surface.
Figure 14B:
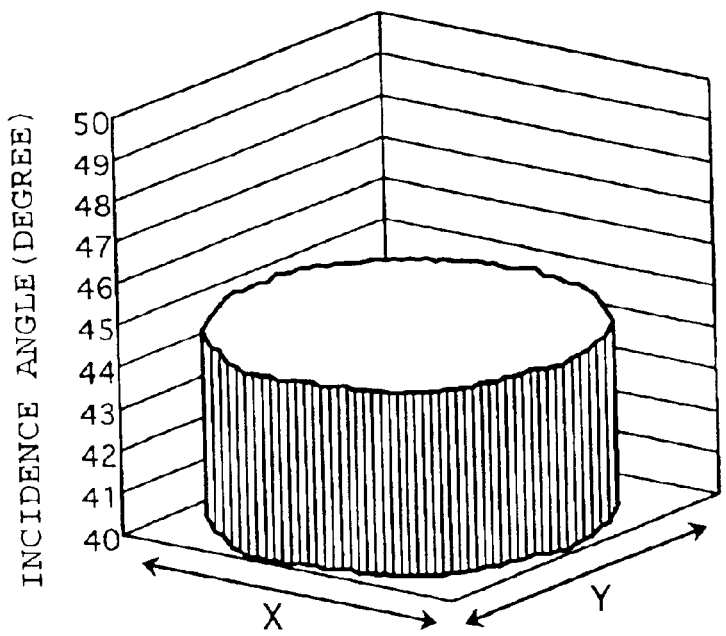
FIG. 14B is a graph showing the distribution of incidence angles on a cylindrical polarization separating surface.

FIGS. 14A and 14B are three-dimensional graphs showing the angles of incidence of the rays of the diverging light to the polarization separating surface of the polarizing beam splitter. FIG. 14A corresponds to the case where the polarization separating surface is a flat surface, and FIG. 14B corresponds to the case where the polarization separating surface is a cylindrical surface optimally designed according to this preferred embodiment. The X-Y plane in each three-dimensional graph represents a cross section of the diverging beam, and the X direction corresponds to a direction of inclination of the polarization separating surface with respect to the optical axis of the diverging light. The height of each three-dimensional graph represents the angles of incidence.

In the distribution of the angles of incidence shown in FIG. 14A, the maximum value of the distribution is ±5.040°, and the standard deviation of the incidence angle is 2.25°. The incidence angle distribution occurs mainly in the X direction, and hardly occurs in the Y direction. Since the characteristics of the polarizing beam splitter depend largely on the incidence angle, the allowable incidence angle distribution is about ±1° at most as shown by Z in FIG. 14A. It is understood from FIG. 14A that the characteristics of the polarizing beam splitter cannot be ensured in the case that the diverging light is incident on the flat polarization separating surface.

As target values in designing the cylindrical polarization separating surface shown in FIG. 14B, the maximum value of the incidence angle distribution is +0.5° or less and the standard deviation of the incidence angle is 0.1° or less. In actual, the maximum value of the incidence angle distribution is ±0.22° and the standard deviation of the incidence angle is 0.08°. As apparent from FIG. 14B, the incidence angle distribution can be suppressed in the case that the diverging light is incident on the cylindrical polarization separating surface of the polarizing beam splitter. As a result, the characteristics of the polarizing beam splitter can be ensured, and the diverging light emitted from the laser diode can be efficiently directed through the polarizing beam splitter toward the magneto-optical disk. Furthermore, signal light included in the return light from the magneto-optical disk can be efficiently extracted. In addition, no phase difference is produced in the optical system. Even when such a polarizing beam splitter having a cylindrical polarization separating surface is arranged near a light source, the characteristics can be ensured. Accordingly, by arranging a polarizing beam splitter having a small-sized cylindrical polarization separating surface at a position where the diameter of a light beam is small, a compact optical pickup can be realized.

Referring to FIG. 15, there is shown a block diagram of connections between a plurality of photodetectors and preamplifier circuits. The power monitoring photodetector 82 is connected to a power monitoring preamplifier 122, so that a signal corresponding to the light quantity detected by the power monitoring photodetector 82 is output from the power monitoring preamplifier 122. The output from the laser diode 84 is controlled according to this output signal from the preamplifier 122. The servo detection photodetectors 80 include four focusing error detection photodetectors 80a and four tracking error detection photodetectors 80b. All the focusing error detection photodetectors 80a are connected to a focusing error detection preamplifier 124. The outputs from two of the four focusing error detection photodetectors 80a are added together and input into the focusing error detection preamplifier 124, and the outputs from the remaining two focusing error detection photodetectors 80a are also added together and input into the preamplifier 124. Then, the difference between the sum of the former outputs and the sum of the latter outputs is detected by the preamplifier 124 and is output therefrom as a focusing error signal.

On the other hand, all the tracking error detection photodetectors 80b are connected to a tracking error detection preamplifier 126. The outputs from two of the four tracking error detection photodetectors 80b are added together and input into the tracking error detection preamplifier 126, and the outputs from the remaining two tracking error detection photodetectors 80b are also added together and input into the preamplifier 126. Then, the difference between the sum of the former outputs and the sum of the latter outputs is detected by the preamplifier 126 and is output therefrom as a tracking error signal. Further, the two MO signal detection photodetectors 78 are both connected to an MO detection preamplifier 128 and an ID detection preamplifier 130. The difference between the outputs from the two MO signal detection photodetectors 78 is detected by the MO detection preamplifier 128 and is output therefrom as an MO signal. Further, the sum of the outputs from the two MO signal detection photodetectors 78 is detected by the ID detection preamplifier 130 and is output therefrom as an ID signal.

A specific example of this preferred embodiment will now be described in conjunction with a comparison. Table 1 shows phase differences in an optical element used in this example and in an optical element used in the comparison. In each of the example and the comparison, the total phase difference is 359°=−1°.

TABLE 1

|  | Example | Comparison |
| --- | --- | --- |
| Measuring wavelength | 686 nm | 686 nm |
| Quarter-wave plate phase difference | 88° | none |
| Cylindrical surface BS center phase difference | 177° | 176° |
| Cylindrical surface mirror phase difference | 94° | 183° |

Table 2 shows specifications and recording mark conditions in an optical system used in this example. In this example, a normal magneto-optical recording medium having a single magnetic layer formed of TbFeCo was used. However, the effect of the present invention can be obtained also by using a MSR medium, which is magnetic layer composed of multiple layers having at least a recording layer and a reproducing layer.

TABLE 2

| Light source wavelength | 685 nm |
| --- | --- |
| Objective lens NA | 0.55 |
| Gauss beam diameter/ entrance pupil diameter | 0.76 (radial direction) 0.95 (tangential direction) |
| Medium, groove shape, etc. | 1.2 mm thick polycarbonate substrate, V-groove, groove depth equivalent to λ/8, land recording, track pitch of 1.1 μm |
| Minimum mark length (2T) | 0.50 μm |
| Write signal | RLL1-7 modulation random signal |
| Writing method | magnetic modulation method |

Figure 16:
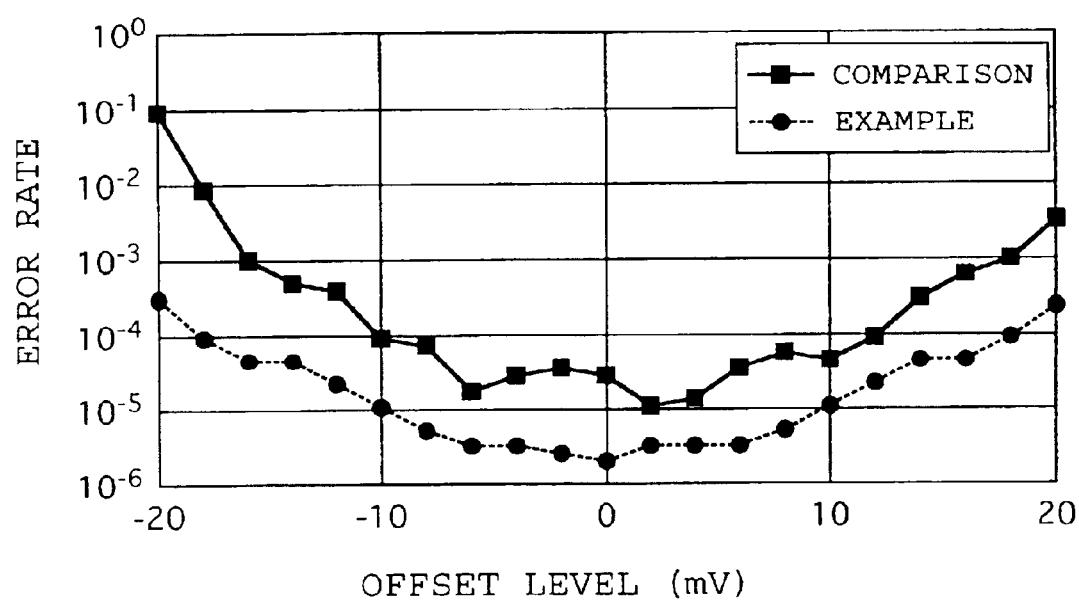
FIG. 16 is a graph showing a result of measurement of an offset margin on an error rate in example of this preferred embodiment in conjunction with comparison.

FIG. 16 shows a result of measurement of a slice-level offset margin on an error rate by the use of the optical systems shown in Tables 1 and 2. The optical system in comparison has no quarter-wave plate. In comparison, the error rate at an offset level of 0 is high and the offset margin is also narrow. To the contrary, in example, the error rate at an offset level of 0 is lower than $10^{-5}$ and the offset margin at error rates of less than $10^{-5}$ is ±10 mV. Thus, a practically good level could be obtained. Further, in comparison, the error rate varies according to the recording medium. To the contrary, example can suppress variations in error rate according to the recording medium. This result has proved that the recording/reproducing characteristics can be improved by suppressing the leakage of noise due to medium defects or the like into an MO signal according to the present invention.

Figure 17:
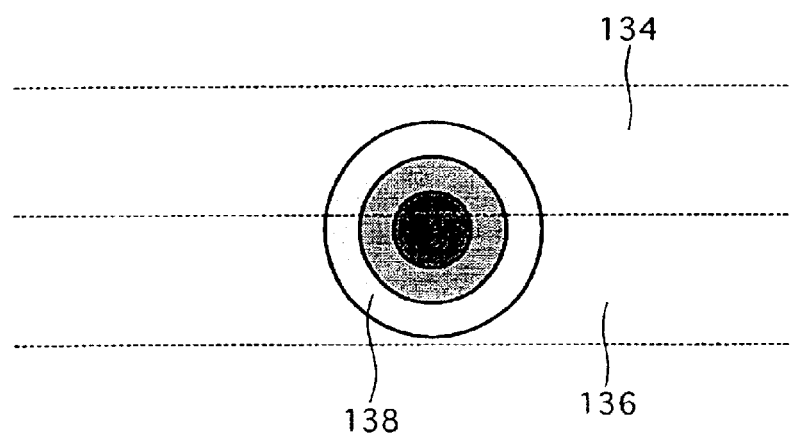
FIG. 17 is a diagram showing GBR.

The present invention is also effective in groove baseband recording (GBR) such that a ROM signal modulated by a high-frequency wobble signal as shown in FIG. 17 is reproduced by an MO detection system. In FIG. 17, reference numerals 134, 136, and 138 denote a groove, a land, and a beam spot, respectively. The GBR technique is a multilevel recording technique for recording a signal by independently meandering both side edges of the groove 134 formed on a disk.

Figure 18:
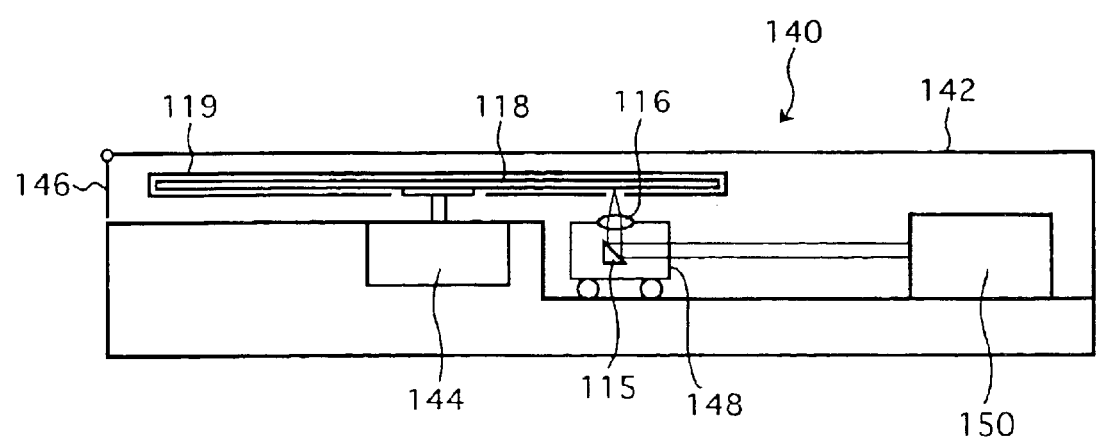
FIG. 18 is a schematic illustration of an optical storage device including the optical pickup according to the present invention.

Referring to FIG. 18, there is schematically shown an optical storage device 140 including the optical pickup according to the present invention. A spindle motor 144 is provided in a housing 142. When an optical disk cartridge 119 is inserted through an inlet door 146 into the housing 142, an optical disk 118 accommodated in the optical disk cartridge 119 is loaded. A carriage 148 movable across the tracks of the optical disk 118 by a voice coil motor (VCM) is provided under the optical disk 118 in its loaded condition. An objective lens 116 and a beam raising prism 115 are mounted on the carriage 148.

A light beam from a light emitting element such as a laser diode provided in a fixed optical system 150 is reflected by the beam raising prism 115 to enter the objective lens 116. The light beam is next focused on a recording surface of the optical disk 118 by the objective lens 116 to form a beam spot on the recording surface. The objective lens 116 is movable along its optical axis by a focusing actuator, and is also movable across the tracks of the optical disk 118 by a tracking actuator.

The optical device according to the present invention includes an optical element having a principal axis perpendicular or parallel to the incidence plane of the diverging light to the polarization separating surface of the polarizing beam splitter. The optical element produces a phase difference of +90° or −90° in the diverging light transmitted through the polarizing beam splitter. When the reflected light from an optical recording medium is incident on the polarization separating surface again, the angle formed between the polarization direction of the reflected light and the incidence plane to the polarization separating surface of the polarizing beam splitter can be suppressed. Accordingly, the leakage of noise due to any medium defects, the guide groove on the medium, etc. into an MO signal can be reduced. In particular, by using a polarizing beam splitter having a cylindrical polarization separating surface, the distribution of incidence angles to the polarization separating surface can be reduced to thereby improve the recording/reproducing characteristics.

While there has been described a specific preferred embodiment of the present invention applied to an optical pickup for a magneto-optical disk drive, the present invention is not limited to the above preferred embodiment, but is similarly applicable also to optical pickups for any other types of optical disk drives, optical card drives, optical tape drives, etc. Further, the present invention is applicable also to an optical device utilizing polarization of light, such as a polarizing microscope.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
   a light source for emitting diverging light;
   a polarizing beam splitter for transmitting or reflecting said diverging light according to a polarized light component;
   a collimator lens for converting said diverging light transmitted through said polarizing beam splitter into collimated light;
   an objective lens for focusing said collimated light on an object; and
   a first optical element arranged between said collimator lens and said objective lens for producing a phase difference of +90°±15° or −90°±15° between P-polarized light and S-polarized light, said first optical element having a principal axis perpendicular or parallel to a plane of incidence of said diverging light on said polarizing beam splitter.

2. An optical device according to claim 1, wherein said first optical element comprises a quarter-wave plate having an optic axis perpendicular or parallel to the plane of incidence of said diverging light on said polarizing beam splitter.

3. An optical device according to claim 1, wherein said first optical element comprises a reflecting mirror whose plane of incidence of said collimated light is parallel or perpendicular to the plane of incidence of said diverging light on said polarizing beam splitter, and a phase difference producing film formed on said reflecting mirror.

4. An optical device according to claim 1, further comprising a second optical element for separating reflected light from said object into polarized light components having polarization directions orthogonal to each other, and a third optical element arranged between said second optical element and said polarizing beam splitter for producing a phase difference of −90°±15° or +90°±15°.

5. An optical device according to claim 4, wherein said second optical element comprises a Wollaston prism.

6. An optical device according to claim 4, wherein said polarizing beam splitter has a polarization separating surface, and said third optical element comprises a phase difference producing film formed on said polarization separating surface.

7. An optical device according to claim 4, further comprising a glass block bonded to said polarizing beam splitter, said glass block having a total reflection surface;
   said third optical element comprising a phase difference producing film formed on said total reflection surface.

8. An optical storage device capable of at least reading information recorded on an optical storage medium, comprising:
   a light source for emitting diverging light;
   a polarizing beam splitter for transmitting or reflecting said diverging light according to a polarized light component;
   a collimator lens for converting said diverging light transmitted through said polarizing beam splitter into collimated light;
   an objective lens for focusing said collimated light on said optical storage medium;
   a reproduction signal detector for detecting a reproduction signal from reflected light from said optical storage medium;
   a servo signal detector for detecting a servo signal for light focused on said optical storage medium from said reflected light; and
   a first optical element arranged between said collimator lens and said objective lens for producing a phase difference of +90°±15° or −90°±15° between P-polarized light and S-polarized light, said first optical element having a principal axis perpendicular or parallel to a plane of incidence of said diverging light on said polarizing beam splitter.

9. An optical storage device according to claim 8, wherein said first optical element comprises a quarter-wave plate having an optic axis perpendicular or parallel to the plane of incidence of said diverging light on said polarizing beam splitter.

10. An optical storage device according to claim 8, wherein said first optical element comprises a reflecting mirror whose plane of incidence of said collimated light is parallel or perpendicular to the plane of incidence of said diverging light on said polarizing beam splitter, and a phase difference producing film formed on said reflecting mirror.

11. An optical storage device according to claim 8, further comprising a second optical element for separating reflected light from said optical storage medium into polarized light components having polarization directions orthogonal to each other, and a third optical element arranged between said second optical element and said polarizing beam splitter for producing a phase difference of −90°±15° or +90°±15°.

12. An optical storage device according to claim 11, wherein said second optical element comprises a Wollaston prism.

13. An optical storage device according to claim 11, wherein said polarizing beam splitter has a polarization separating surface, and said third optical element comprises a phase difference producing film formed on said polarization separating surface.

14. An optical storage device according to claim 11, further comprising a glass block bonded to said polarizing beam splitter, said glass block having a total reflection surface;
   said third optical element comprising a phase difference producing film formed on said total reflection surface.

* * * * *